United States Patent [19]

Natori et al.

[11] Patent Number: 5,325,194
[45] Date of Patent: Jun. 28, 1994

[54] MULTIPOINT VIDEO CONFERENCING SYSTEM

[75] Inventors: Hiroaki Natori; Hitoshi Takei, both of Kawasaki, Japan

[73] Assignee: Fujitsu Limited, Kawasaki, Japan

[21] Appl. No.: 935,426

[22] Filed: Aug. 26, 1992

[30] Foreign Application Priority Data

Aug. 29, 1991 [JP] Japan .................. 3-218455

[51] Int. Cl.⁵ .............................. H04N 7/13
[52] U.S. Cl. ........................ 348/15; 348/159
[58] Field of Search ............. 379/53, 54; 358/84, 358/85, 93, 108; H04N 7/13

[56] References Cited

U.S. PATENT DOCUMENTS

| | | | |
|---|---|---|---|
| 3,601,530 | 8/1971 | Edson et al. | 379/54 |
| 4,054,908 | 10/1977 | Poirier et al. | 379/54 |
| 4,449,238 | 5/1984 | Lee et al. | 379/54 |
| 4,682,349 | 7/1987 | Sorriaux | 379/53 |
| 4,888,795 | 12/1989 | Ando et al. | 379/53 |
| 4,995,071 | 2/1991 | Weber et al. | 358/85 |
| 5,063,440 | 11/1991 | Hong | 379/53 |
| 5,073,927 | 12/1991 | Grube | 379/53 |

Primary Examiner—Howard W. Britton
Assistant Examiner—Richard Lee
Attorney, Agent, or Firm—Armstrong, Westerman, Hattori, McLeland & Naughton

[57] ABSTRACT

In a multipoint video conferencing system wherein two images of a selected primary conference room and a selected secondary conference room are distributed to each CT, an unnaturalness, such that an exchange of right and left images occurs while a conversation is held between two conference rooms, arises. The unnaturalness is avoided by constructing the conference room terminal so that images displayed on two screen are exchanged when both of the primary and the secondary conference rooms are altered.

7 Claims, 11 Drawing Sheets

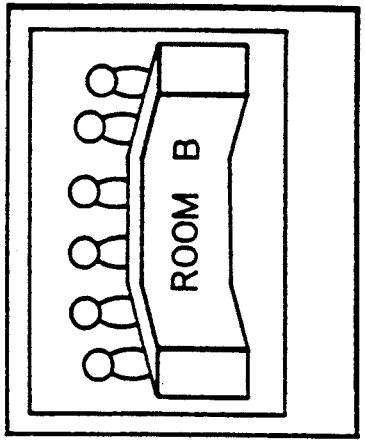
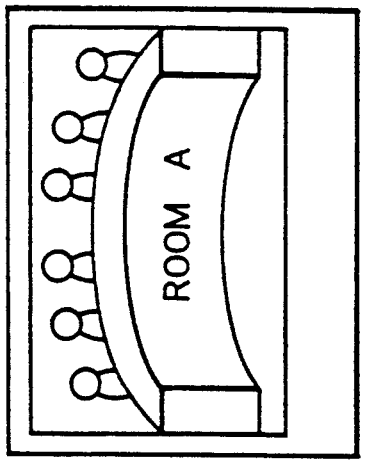
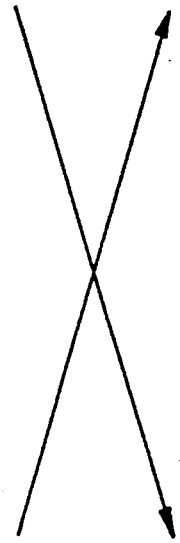
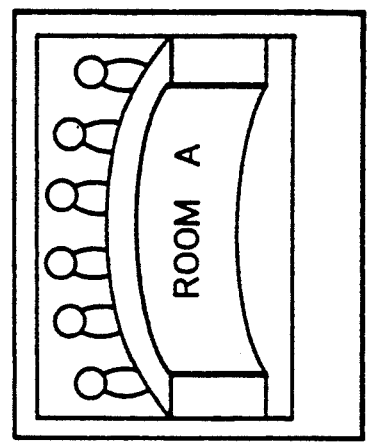
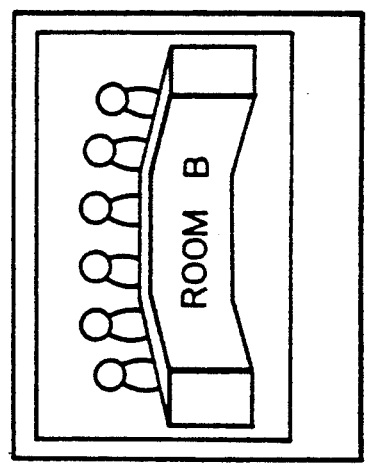
Fig. 4A(a) PRIOR ART
Fig. 4B(b) PRIOR ART
Fig. 4A PRIOR ART
Fig. 4B PRIOR ART

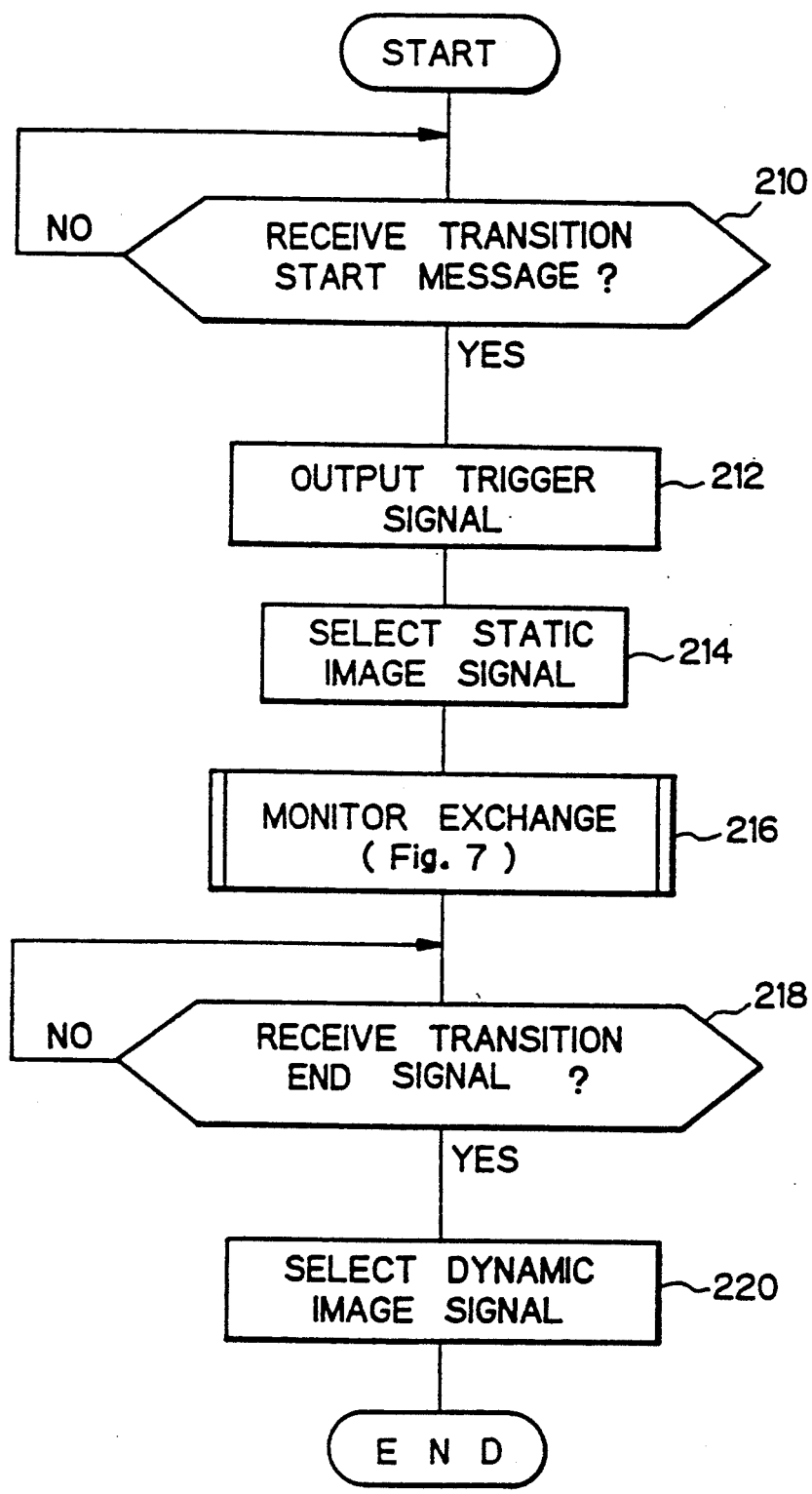

MULTIPOINT VIDEO CONFERENCING SYSTEM

BACKGROUND OF THE INVENTION

Field of the Invention

The present invention relates to a multipoint video conferencing system, or more particularly, a multipoint video conferencing system wherein images chosen in selected two conference rooms are distributed to be displayed in each conference room.

Description of the Related Art

A multipoint video conference is realized, for example, by providing an MCU (multipoint control unit) connected through a star network to CT's (conference room terminals) provided in each conference room. The MCU carries out selection and distribution of images, mixing of voices, and centralized control of a whole system.

The MCU automatically selects a conference room, for example, where a speaker is present, as a primary conference room by detecting a speech signal, and distributes an image of the primary conference room to other conference rooms except for the primary conference room. To the primary conference room, an image of a secondary conference room, for example, that which had been a primary conference room before, is distributed. In this system, an image of only one conference room can be seen in each conference room. While a conversation is being held in two conference rooms, although an image of a speaker can be seen, an image of the speaker's opponent cannot be seen from the third conference rooms, and therefore, a kind of incompatibility arises for participants in the third conference rooms.

This shortcomings may be overcome by distributing two images as to the primary and the secondary conference rooms to the third conference rooms and by displaying the images on two monitor screens in the third conference rooms. Data of two images are mixed into a transmission data stream including image data of the primary conference room in larger transmission capacity and image data of the secondary conference room in smaller transmission capacity. The two images are separated in the CT's, and are displayed on respective display screens. Since the transmission capacity for the primary conference room is larger than that for the secondary conference room, resolution and renewal frequency of the image displayed on the screen for the primary conference room are larger than those on the screen for the secondary conference room.

To the primary reference room, images of the secondary reference room and a tertiary conference room are distributed. The tertiary conference room is a conference room that was the secondary conference room before. To the secondary conference room, images of the primary and the tertially conference room are distributed.

In the aforementioned system, however, although the speaker and the opponent are simultaneously displayed, every time the speaker changes from one conference room to another, images displayed on each monitor screen change from one conference room to another, and therefore, displayed locations of persons changing from one screen to another, appears unnatural.

SUMMARY OF THE INVENTION

It is an object of the present invention to provide a conference room terminal of a multipoint video conferencing system wherein two images from two conference rooms are simultaneously displayed on screens of each conference room without causing unnaturalness.

In accordance with the present invention, there is provided a conference room terminal of a multipoint video conferencing system including a plurality of conference room terminals provided in a plurality of conference rooms and including a multipoint control unit adapted to being connected to each conference room terminal in order to receive images of the conference rooms and to distribute images of a selected primary conference room and a selected secondary conference room in different transmission rates, comprising means for displaying the images distributed from the multipoint control unit on two display screens, individually, means for sensing change in selections of the primary and the secondary conference rooms, and means for exchanging images displayed on the display screens, when change in selections of both of the primary and the secondary conference rooms is sensed by the sensing means.

BRIEF DESCRIPTIONS OF DRAWINGS

Figure 5:
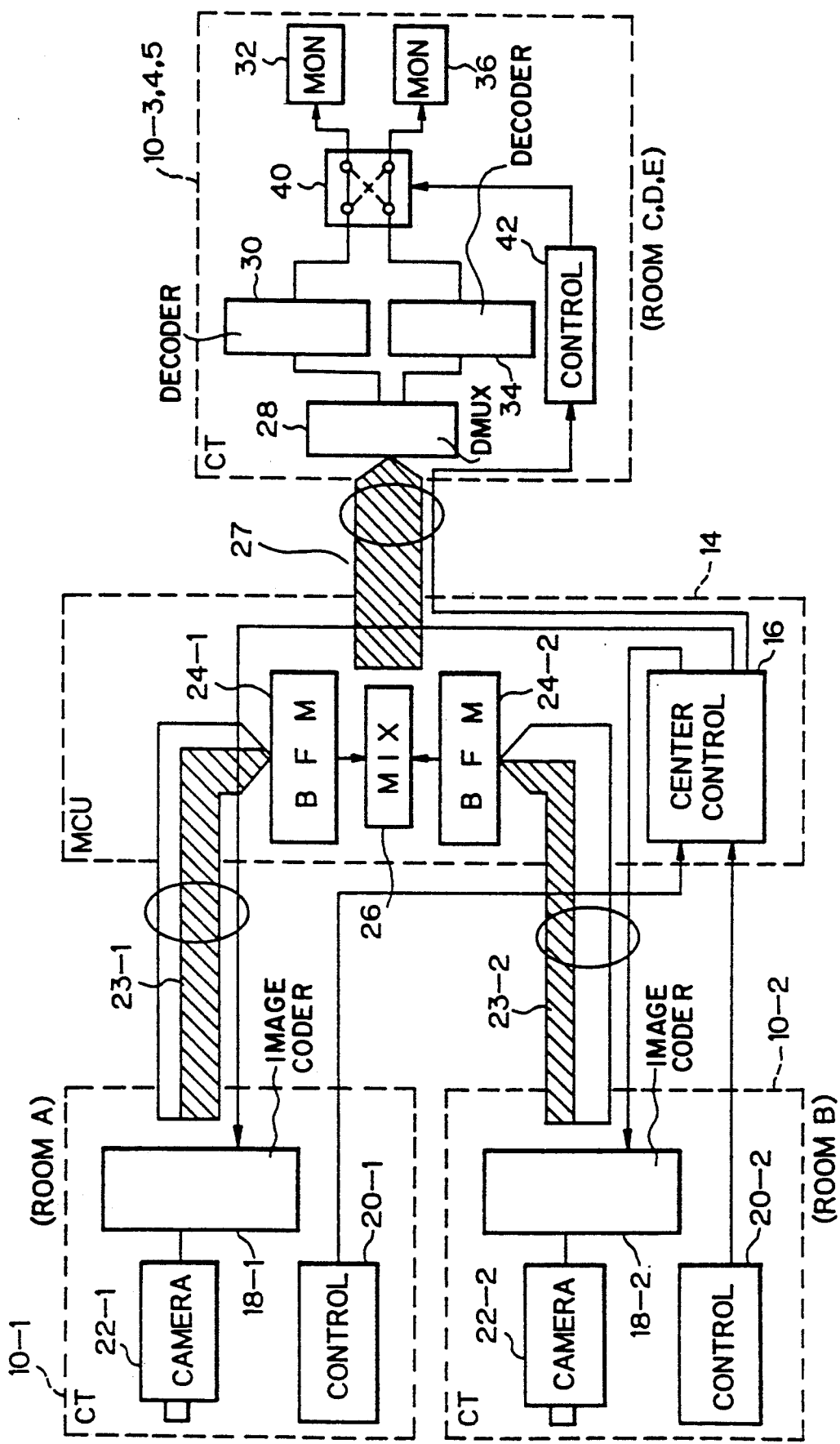
Figure 6:
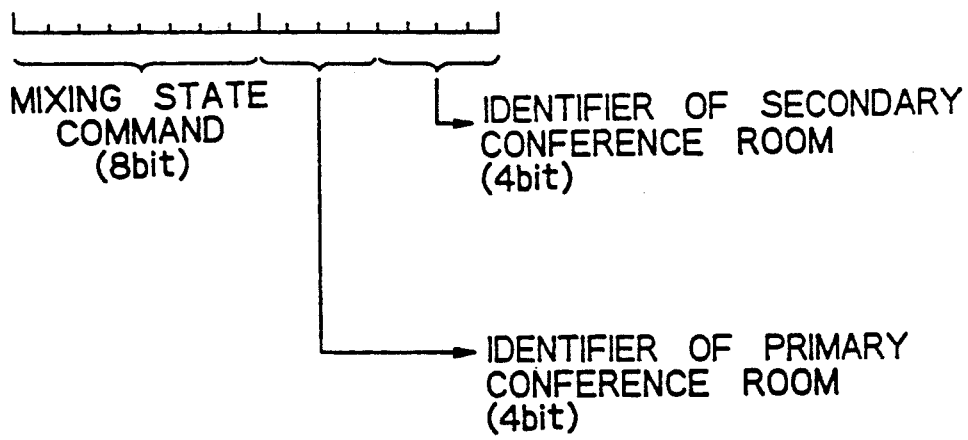
Figure 7:
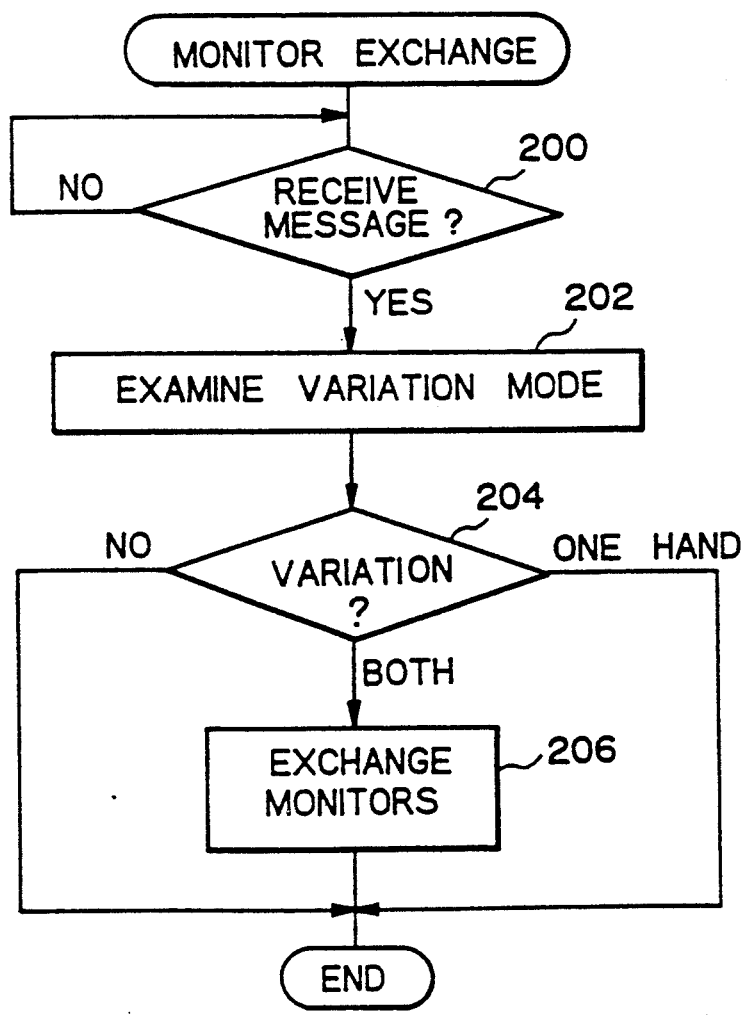
Figure 8:
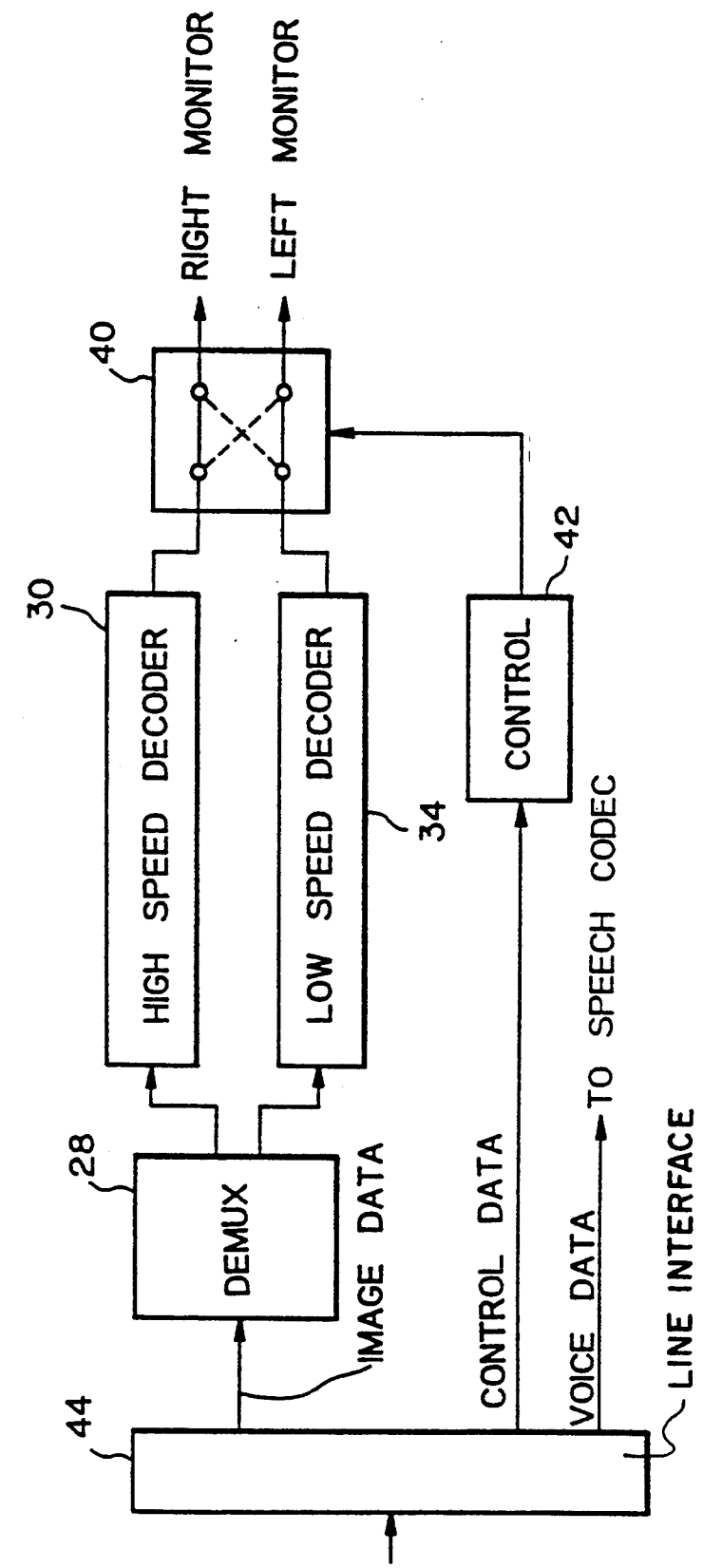
Figure 9:
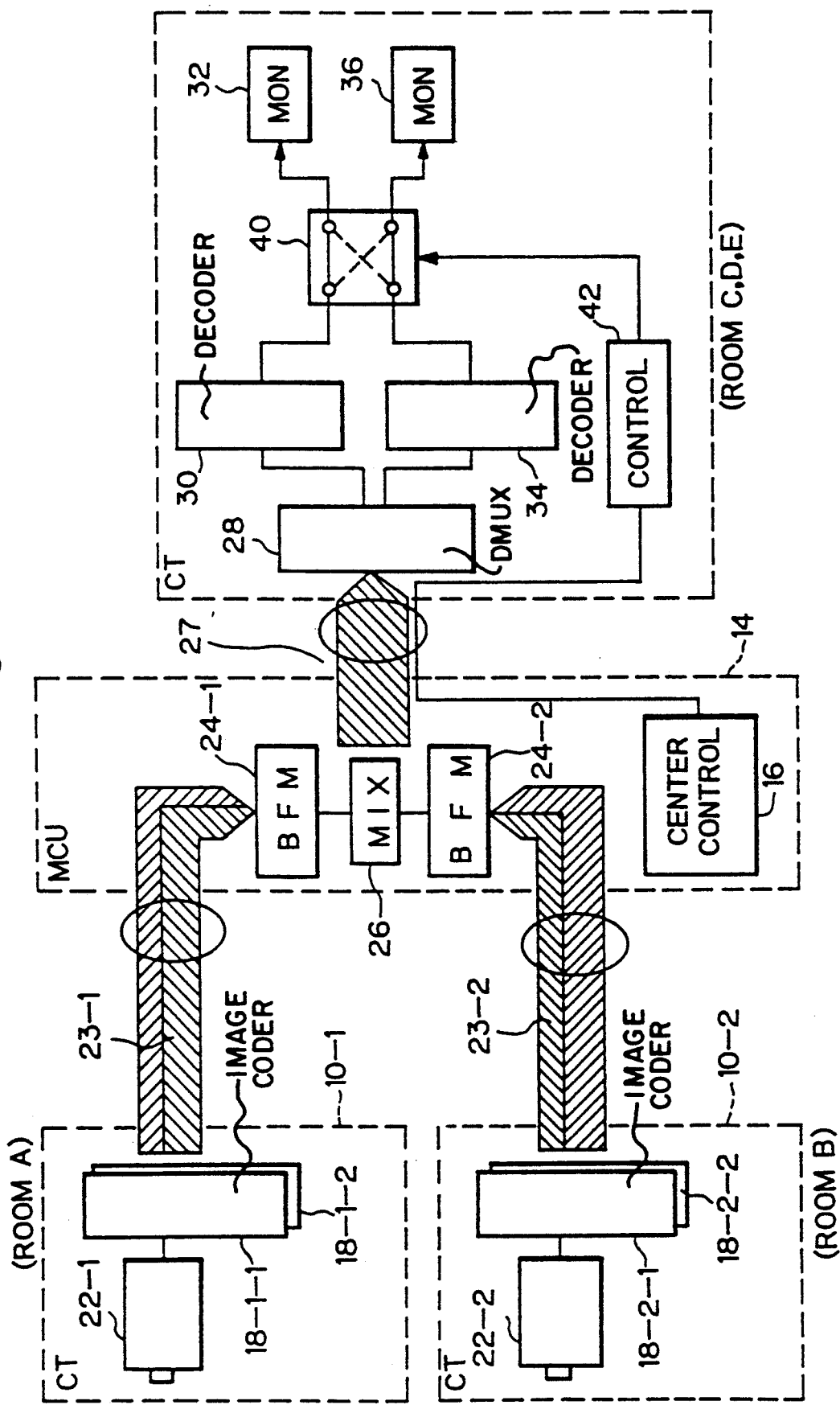
Figure 10A:
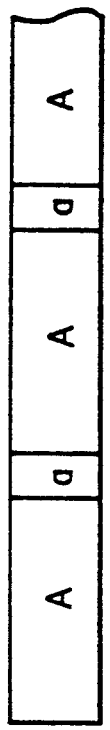
Figure 10B:
Figure 10C:
Figure 11:
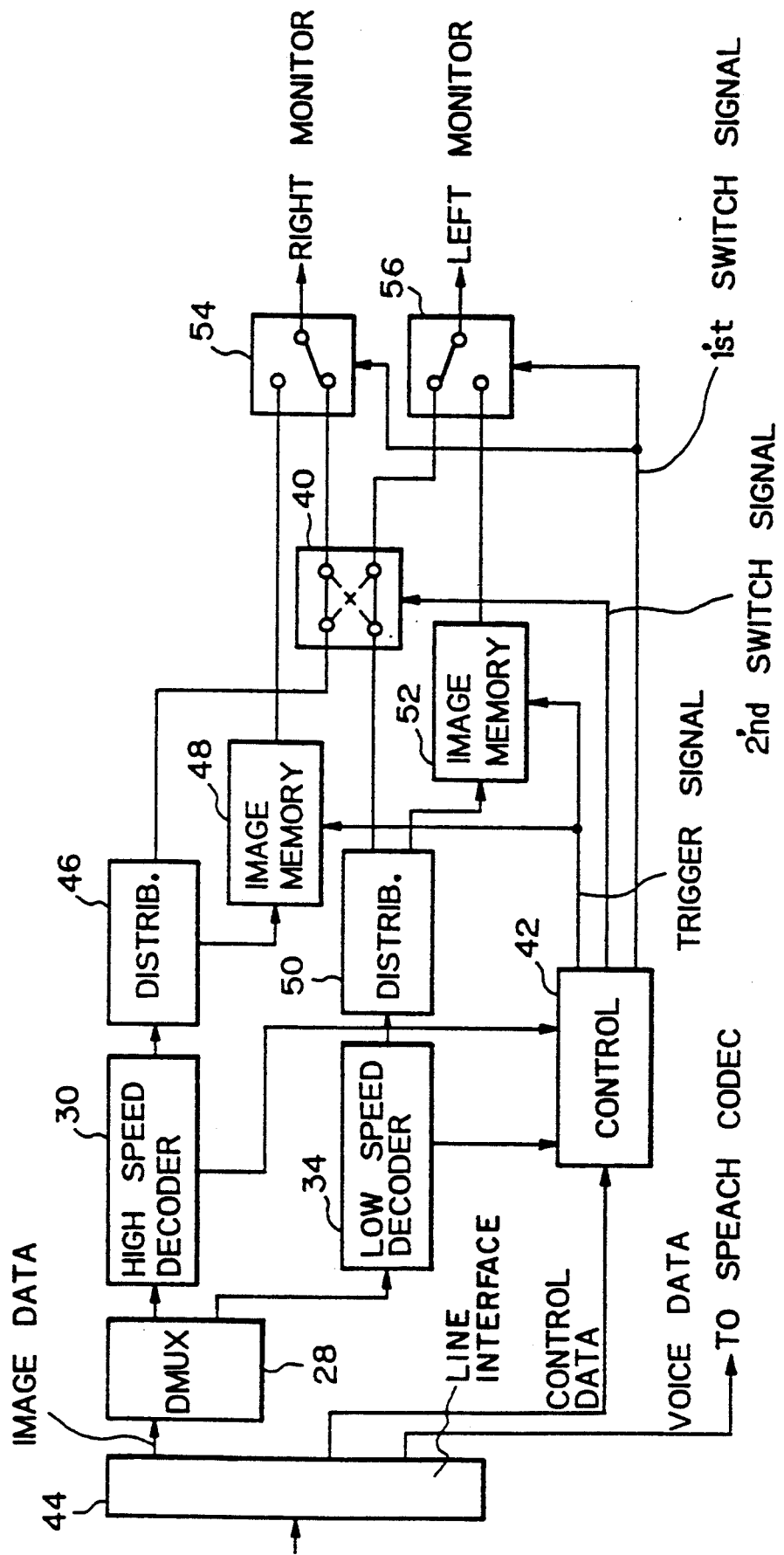

FIGS. 4A, 4A($a$), 4B and 4B($b$) are diagrams showing a problem in the related art;

FIG. 5 is a block diagram showing a construction of a multipoint video conferencing system according to an embodiment of the present invention;

FIG. 6 is a diagram showing a format of a mixing state message;

FIG. 7 is a flow chart showing a monitor exchange process in the system of FIG. 5;

FIG. 8 is a block diagram showing a detailed construction of the conference room terminal of FIG. 5;

FIG. 9 is a block diagram showing a construction of a multipoint video conferencing system according to another embodiment of the present invention;

FIGS. 10A to 10C are diagrams conceptually showing transmission data in the system of FIG. 9;

FIG. 11 is a block diagram showing a construction of a conference room terminal according to another embodiment of the present invention; and FIG. 12 is a flow chart showing an operation of the conference room terminal of FIG. 11.

DESCRIPTION OF THE PREFERRED EMBODIMENTS

Before describing the preferred embodiments according to the present invention, examples of the related art are given with reference to the accompanying drawings.

Figure 1:
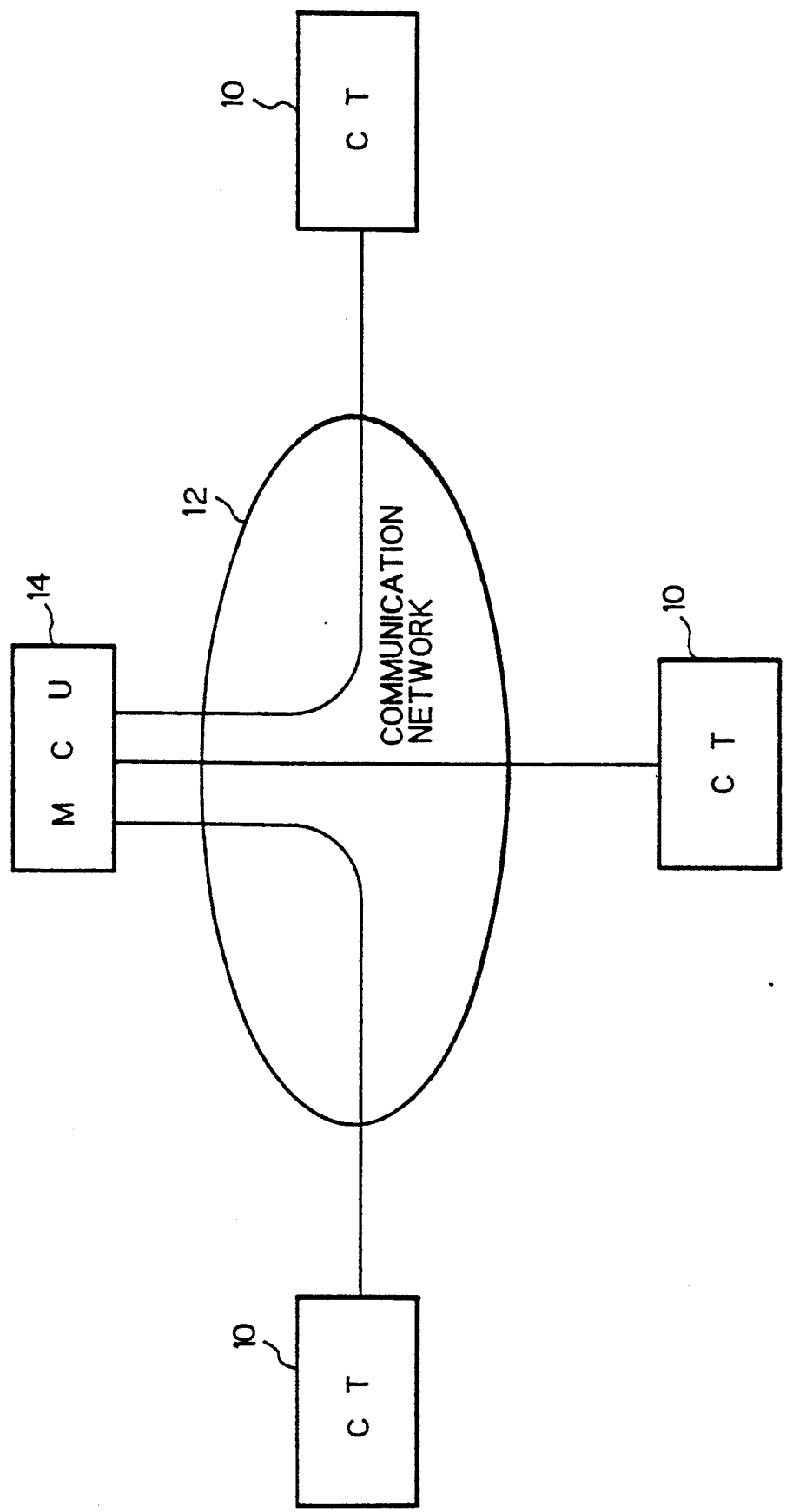
FIG. 1 is a diagram showing a generic construction of a multipoint video conferencing system.

FIG. 1 shows a generic construction of a multipoint video conferencing system. CT's (conference room terminals) 10 are provided in each conference room. The CT's 10 are connected through a communication network 12 to an MCU (multipoint conference unit) 14 so that a star network is constructed.

Figure 2:
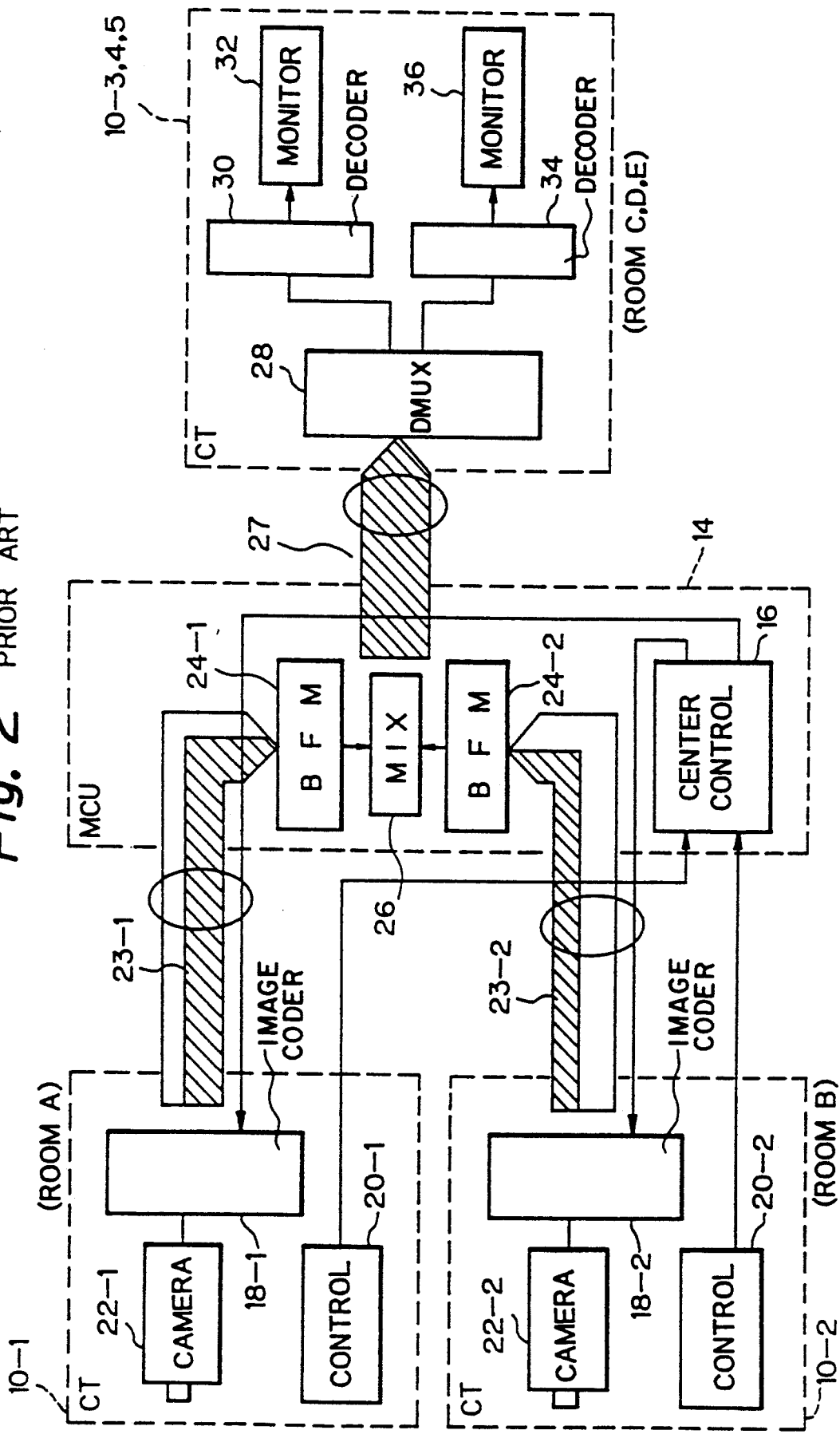
FIG. 2 is a block diagram showing a construction of a conventional mulipoint video conferencing system.

FIG. 2 shows a detailed construction of CT 10 and MCU 14 of a multipoint video conferencing system wherein two images are distributed to each CT. CT's 10-1 to 10-5 are provided in conference rooms A to E, respectively, and connected to the MCU 14. In FIG. 2, persons present at the conference room A are conversing with persons present at the conference room B, and persons present at the conference rooms C, D and E are listening to the conversation. In FIG. 2, equipment for receiving images within the CT's 10-1 and 10-2 and equipment for transmitting images within the CT's 10-3, 4 are omitted to simplify the drawing.

A center control unit 16 provided in the MCU 14 determines the primary, secondary, and tertiary conference rooms by detecting speech signals. If it is determined that the conference room A is the primary conference room and that the conference room B is the secondary conference room, the center control unit 16 sets a transmission rate of an image coder 18-1 of the CT 10-1 to a higher value and sets a transmission rate of an image coder 18-2 of the CT 10-2 to a lower value. After switching of the transmission rate is finished, switching end signals are sent from control units 20-1, 20-2 to the center control unit 16.

Figure 3A:
FIGS. 3A to 3C are diagrams conceptually showing transmission data in the system of FIG. 2.
Figure 3B:

The image coder 18-1 of the CT 10-1 codes chosen images of the conference room A in camera 22-1 at a higher transmission rate, and image data having a higher transmission rate are transmitted from the CT 10-1 through a transmission line 23-1 to the MCU 14. The image coder 18-2 of the CT 10-2 codes chosen images of the conference room B in camera 22-2 at a lower transmission rate, and image data having a lower transmission rate are transmitted from the CT 10-2 through a transmission line 23-2 to the MCU 14. The image data of the conference room A that have a higher transmission rate and the image data of the conference room B, that have a lower transmission rate are conceptually shown in FIG. 3A and FIG. 3B, respectively.

Figure 3C:
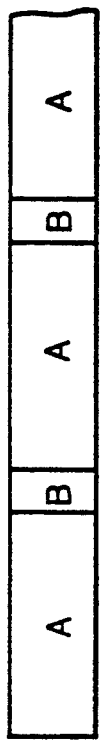

Upon receiving the image data of the conference room A and B, the MCU 14 temporarily stores the high speed data and low speed data into a buffer memory 24-1 and a buffer memory 24-2, respectively, and the high speed data and low speed data are mixed with each other in mixer 26, as conceptually shown in FIG. 3C. The mixed image data are distributed through a transmission line 27 to the other CT's 10-3, 4, 5.

The mixed image data received in the CT's 10-3, 4, 5 are separated into high speed data and low speed data in a demultiplexer 28. The high speed data are decoded into analog image signals in a decoder 30, and images of the primary conference room are displayed on a monitor 32. The low speed data are decoded into analog image signals in a decoder 34, and images of the secondary conference room are displayed on a monitor 36. Since the transmission rate of the image data of the primary conference room is larger than that of the secondary conference room, resolution and renewal frequency of the image displayed on the monitor 32 are larger than those on the monitor 36.

Suppose that the monitor 32 is placed on the left and the monitor 36 is placed on the right. While a person present at the conference room A is speaking, since the conference room A is determined as the primary conference room and the conference room B is determined as the secondary conference room, an image of the conference room A is displayed on the monitor 32 placed on the left and an image of the conference room B is displayed on the monitor 36 placed on the right, as shown in FIG. 4A. Next, when a person present at the conference room B starts speaking, images of the conference room A and B are exchanged as shown in FIG. 4B, because the conference room B becomes the primary conference room and the conference room A becomes the secondary conference room. Thus, every time the speaker changes, images on the monitors are exchanged, and therefore, unnaturalness arises.

The preferred embodiment of the present invention will now be described with reference to the accompanying drawings.

FIG. 5 shows a construction of a multipoint video conferencing system according to the present invention. A switch 40 for exchanging connections between the decoders 30, 34 and monitors 32, 36, and a control unit 42 for controlling the switch 40, are provided in each CT 10. The center control unit 16 in the MCU 14 generates a mixing state message shown in FIG. 6, when the primary conference room and/or secondary conference room has changed.

The mixing state message includes a mixing state command, an identifier of a conference room determined as the primary conference room, and an identifier of a conference room determined as the secondary conference room. The mixing state command is 8 bit of fixed data, and the identifiers of the primary and the secondary conference rooms are 4 bit of variable data.

The mixing state message is transmitted through the transmission line 27 to the control unit 42 of the CT's 10-3, 4, 5. FIG. 7 is a flow chart showing a monitor exchange process of the control unit 42 in response to the mixing state message. If the mixing state message is received in step 200, a mode of variation of the identifiers of the primary and the secondary conference rooms is examined in step 202, by comparing contents of the message with that received last. In step 204, if the variation does not exist or if the variation exists only in one hand, the process is ended. If both of identifiers of the primary and the secondary conference rooms vary, monitors 32, 36 are exchanged by changing the switch 40 in step 206.

FIG. 8 shows a detailed construction of the CT 10 according to the present invention. In FIG. 8 transmission equipment is omitted. A line interface 44 provides an interface between the transmission line and the CT 10. The line interface 44 separates an image data, control data and voice data from a multiple input signal. The image data are separated into the high speed image signal and the low speed image signal in the demultiplexer 28. The high speed image signal is converted into a high speed analog image signal in the high speed decoder 30. The low speed image signal is converted into a low speed analog image signal in the low speed decoder 34.

The control data is fed to the control unit 42. The control data includes the mixing state message shown in FIG. 6 that is used in the monitor exchange process shown in FIG. 7.

In the aforementioned embodiment, since the high speed image and the low speed image are exchanged between the right monitor and the left monitor when both of the primary and the secondary conference rooms are changed, an unnecessary exchange of images is avoided, thereby avoiding visual difficulties as well.

In the aforementioned embodiment, however, confusion of images, such that the same images are displayed on both monitors at the same time, may occur during transition between high speed images and low speed images on each monitor. Namely, after the transmission rates in the image coders 18-1 and 18-2 have been changed, new images are not simultaneously obtained in the high speed data and the low speed data, but the low speed image is obtained after a delay period, because a renewal frequency of the low speed image is smaller than that of the high speed image. Therefore, images of the same conference room are briefly displayed on the monitors 32 and 36.

FIG. 9 shows another embodiment of the present invention, wherein the above problems of the delay period is reduced. In FIG. 9, the CT 10-1 is provided with a high speed image coder 18-1-1 and a low speed image coder 18-1-2, and the CT 10-2 is provide with a high speed image coder 18-2-1 and a low speed image coder 18-2-2, in order to simultaneously generate the high speed image data and the low speed image data.

As conceptually shown in FIG. 10A, the high speed image data (A) and the low speed image data (a) of the conference room A are mixed with each other and are transmitted through the transmission line 23-1 to the MCU 14, and as shown in FIG. 10B, the high speed image data (b) and the low speed image data (B) of the conference room B are mixed with each other and are transmitted through the transmission line 23-2 to the MCU 14. In the MCU 14, the high speed image data of a selected primary conference room and the low speed image data of the secondary conference room are mixed together as shown in FIG. 10C, and are transmitted through the transmission line 27 to the CT's 10-3, 4, 5. Construction and operation of receiver equipment of the CT's are the same as those shown in FIG. 5.

In the above construction, the delay time caused by change of the transmission rates in the transmission sides is avoided. In addition, since the MCU 14 always receives both the high speed data and low speed data from each CT 10, change of the primary and the secondary conference rooms is performed only by selecting the received data and does not require set operation of the transmission rates.

FIG. 11 is a block diagram showing a construction of a CT according to another embodiment of the present invention. As in FIG. 8, transmission equipment is omitted in FIG. 11. A distributor 46 distributes high speed analog image signals output from the high speed decoder 30 to the switch 40 and to an image memory 48. Similarly, a distributor 50 distributes low speed analog image signals output from the low speed decoder 34 to the switch 40 and to an image memory 52. The image memories 48 and 52 store the dynamic image data output from the distributor 46 and 50, respectively, as static image data in synchronism with a trigger signal output from the control unit 42. The switch 40 is controlled by a second switch signal output from the control unit 42. Switches 54 and 56 select dynamic image signals output from the switch 40 or the static image signals output from the image memories 48 and 52 according to a first switch signal output from the control unit 42, and feeds the selected signals to the right and left monitors.

An operation of the control unit 42 of FIG. 11 is described with reference to a flow chart of FIG. 12.

Preceding switching of images of the conference rooms in the MCU 14 (FIG. 5), a transition start message indicating the start of transition period is sent from the center control unit 16 of the MCU 14. Upon receiving the transition start message in step 210, the control unit 42 outputs the trigger signal to the image memories 48 and 52 in step 212, to thereby freeze the images and to store the frozen images into the image memories 48 and 52. In step 214, the first switch signal is output to the switches 54 and 56 so that the switches 54 and 56 select data of the frozen images output from the image memories 48 and 52. While the frozen images are displayed on the right and left monitors, in step 216, the monitor exchange process described with reference to FIG. 7 is executed. After switching of images has finished in MCU 14, a transition end message is sent from the center control unit 16 of the MCU 14. Upon receiving the transmission end message, the control unit 42 alters the first switch signal so that the switches 54 and 56 select the dynamic image data output from the distributor 46 and 56, respectively.

In the above construction, since images on the monitors are frozen until switching of images in MCU and exchange of monitors in CT are completed, confusion or distortion of images can be completely avoided.

We claim:

1. A multipoint video conferencing system including a plurality of conference room terminals provided in a plurality of conference rooms and including a multipoint control unit operably connected to each conference room terminal in order to receive images of the conference rooms and to distribute images of a selected primary conference room and a selected secondary conference room in different transmission rates, each of said plurality of conference room terminals comprising:

means for displaying the images distributed from the multipoint control unit on two display screens, individually;

means for sensing change in selections of the primary and the secondary conference rooms; and means for exchanging images displayed on the display screens, when change in selections of both of the primary and the secondary conference rooms is sensed by the sensing means, wherein said exchanging means comprise first and second decoders, and a switch means for exchanging respective connections of said first and second decoders with said display screens.

2. A multipoint video conferencing system as claimed in claim 1, the sensing means of which includes:

means for receiving a message including identifiers of conference rooms selected as the primary and the secondary conference rooms, and means for comparing contents of a currently received message with contents of last received message, to thereby sense the change.

3. A multipoint video conferencing system as claimed in claim 1, wherein said exchanging means further comprises a means for controlling said switch means.

4. A multipoint video conferencing system as claimed in claim 1, wherein:

a first conference room terminal includes a first image coder having a high speed image coder and a low speed image coder; and a second conference room terminal includes a second image coder having a high speed image coder and a low speed image coder.

5. A multipoint video conferencing system as claimed in claim 1, wherein the image of the primary conference room is transmitted in a transmission rate higher than that of the secondary conference room.

6. A multipoint video conferencing system as claimed in claim 5, further comprising:

a first image coder generating image data in the higher transmission rate and a second image coder generating image data in the lower transmission rate.

7. A multipoint video conferencing system including a plurality of conference room terminals provided in a plurality of conference rooms and including a multipoint control unit operably connected to each conference room terminal in order to receive images of the conference rooms and to distribute images of a selected primary conference room and a selected secondary conference room in different transmission rates, each of said plurality of conference room terminals comprising:

means for displaying the images distributed from the multipoint control unit on two display screens, individually;

means for sensing change in selections of the primary and the secondary conference rooms;

means for exchanging images displayed on the display screens, when change in selections of both of the primary and the secondary conference rooms is sensed by the sensing means, wherein said exchanging means comprises first and second decoders, and a switch means for exchanging respective connections of said first and second decoders with said display screens;

mean for storing the images distributed from the multipoint control unit as static images;

means for selecting the distributed images or the static images stored in the storing means and for feeding the selected images to the display screens; and means for controlling the storing means so as to store the static images before the exchanging means exchanges the images, and for controlling the selecting means so as to select the static images after the storing means stores the static images and before the exchanging means exchanges the images, and so as to select the distributed images after exchange in the exchanging means is completed.

* * * * *